(12) United States Patent
Romanenko et al.

(10) Patent No.: US 10,334,151 B2
(45) Date of Patent: Jun. 25, 2019

(54) PHASE DETECTION AUTOFOCUS USING SUBAPERTURE IMAGES

(71) Applicant: Google LLC, Mountain View, CA (US)

(72) Inventors: Yuriy Romanenko, San Jose, CA (US); Edmond Chung, Milpitas, CA (US); Joachim Deguara, Felton, CA (US)

(73) Assignee: GOOGLE LLC, Mountain View, CA (US)

( * ) Notice: Subject to any disclaimer, the term of this patent is extended or adjusted under 35 U.S.C. 154(b) by 65 days.

(21) Appl. No.: 15/162,426

(22) Filed: May 23, 2016

(65) Prior Publication Data

US 2016/0269620 A1    Sep. 15, 2016

Related U.S. Application Data

(63) Continuation-in-part of application No. 13/867,333, filed on Apr. 22, 2013, now Pat. No. 9,456,141.

(51) Int. Cl.
*G06K 9/62* (2006.01)
*G06T 7/73* (2017.01)
(Continued)

(52) U.S. Cl.
CPC ....... *H04N 5/23212* (2013.01); *G06K 9/6201* (2013.01); *G06T 7/73* (2017.01); *H04N 5/2628* (2013.01)

(58) Field of Classification Search
CPC .... H04N 5/23212; H04N 5/2628; G06T 7/73; G06K 9/6201
See application file for complete search history.

(56) References Cited

U.S. PATENT DOCUMENTS 725,567 A    4/1903   Ives
4,383,170 A  5/1983   Takagi et al.
(Continued)

FOREIGN PATENT DOCUMENTS

CN   101226292   7/2008
CN   101309359   11/2008
(Continued)

OTHER PUBLICATIONS

Haeberli, "A Multifocus Method for Controlling Depth of Field" GRAPHICA Obscura, 1994, pp. 1-3.
(Continued)

*Primary Examiner* — Timothy J Henn

(57) ABSTRACT

A light-field camera may have enhanced autofocus functionality that does not require a dedicated optical pathway or dedicated sensors, and yet brings the camera rapidly into focus for image capture. According to one method, light may be received through the aperture of a light-field camera, with the main lens of the light-field camera at a first focus setting. The light may be directed to a sensor of the light-field camera via an optical pathway. The sensor may capture the light to generate preliminary light-field data. In a processor, the preliminary light-field data may be used to generate an offset, which may be used to refocus the main lens to a second focus setting. Additional light may be directed along the same optical pathway and captured with the main lens at the second focus setting to capture a focused light-field image.

16 Claims, 11 Drawing Sheets

(51) Int. Cl.
*H04N 5/232* (2006.01)
*H04N 5/262* (2006.01)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,427,548 B2 | 4/2013 | Lim |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 * | 6/2014 | Knight ............ H04N 13/218 348/49 |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,860,856 B2 | 10/2014 | Wetzstein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |

(56) References Cited

U.S. PATENT DOCUMENTS

| | | |
|---|---|---|
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0008265 A1* | 1/2006 | Ito ................ G02B 7/102 396/125 |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1* | 6/2007 | Nakahara ............ G02B 7/38 396/103 |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0252074 A1* | 11/2007 | Ng ................ G02B 3/0056 250/208.1 |
| 2007/0269108 A1 | 11/2007 | Steinberg et al. |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0131019 A1 | 6/2008 | Ng |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1* | 8/2009 | Li ................ H04N 5/23212 396/125 |
| 2009/0204813 A1 | 8/2009 | Kwan |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0128145 A1 | 5/2010 | Pitts et al. |
| 2010/0129048 A1 | 5/2010 | Pitts et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277629 A1 | 11/2010 | Tanaka |
| 2010/0303288 A1 | 12/2010 | Malone |
| 2010/0328485 A1 | 12/2010 | Imamura et al. |
| 2011/0001858 A1* | 1/2011 | Shintani ............ G02B 7/28 348/294 |

(56) References Cited

U.S. PATENT DOCUMENTS

| | | |
|---|---|---|
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0091192 A1* | 4/2011 | Iwane .................. G02B 7/34 396/113 |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0261164 A1 | 10/2011 | Olesen et al. |
| 2011/0261205 A1 | 10/2011 | Sun |
| 2011/0267263 A1 | 11/2011 | Hinckley |
| 2011/0273466 A1 | 11/2011 | Imai et al. |
| 2011/0133649 A1 | 12/2011 | Bales et al. |
| 2011/0292258 A1 | 12/2011 | Adler |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1* | 10/2012 | Velarde ............... H04N 5/2258 348/175 |
| 2012/0257795 A1 | 10/2012 | Kim et al. |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2012/0327222 A1 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1* | 3/2013 | Nagasaka ............. H04N 5/225 382/190 |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168484 A1* | 6/2014 | Suzuki ............... H04N 5/23212 348/246 |
| 2014/0176540 A1 | 6/2014 | Tosic et al. |
| 2014/0176592 A1* | 6/2014 | Wilburn ............. H04N 5/23212 345/589 |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1* | 12/2014 | Strandemar ............. G06T 3/00 348/136 |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0130986 A1* | 5/2015 | Ohnishi ............. H04N 5/23212 348/349 |

(56) References Cited

U.S. PATENT DOCUMENTS

| | | | |
|---|---|---|---|
| 2015/0193937 A1 | 7/2015 | Georgiev et al. | |
| 2015/0206340 A1 | 7/2015 | Munkberg et al. | |
| 2015/0207990 A1 | 7/2015 | Ford et al. | |
| 2015/0237273 A1 | 8/2015 | Sawadaishi | |
| 2015/0104101 A1 | 10/2015 | Bryant et al. | |
| 2015/0288867 A1* | 10/2015 | Kajimura | H04N 5/2171 348/231.6 |
| 2015/0304544 A1* | 10/2015 | Eguchi | H04N 5/23212 348/346 |
| 2015/0310592 A1 | 10/2015 | Kano | |
| 2015/0312553 A1 | 10/2015 | Ng et al. | |
| 2015/0312593 A1 | 10/2015 | Akeley et al. | |
| 2015/0370011 A1 | 12/2015 | Ishihara | |
| 2015/0370012 A1 | 12/2015 | Ishihara | |
| 2016/0029017 A1 | 1/2016 | Liang | |
| 2016/0142615 A1 | 5/2016 | Liang | |
| 2016/0155215 A1 | 6/2016 | Suzuki | |
| 2016/0165206 A1* | 6/2016 | Huang | H04N 13/0011 382/154 |
| 2016/0173844 A1 | 6/2016 | Knight et al. | |
| 2016/0191823 A1 | 6/2016 | El-Ghoroury | |
| 2016/0253837 A1 | 9/2016 | Zhu et al. | |
| 2016/0307368 A1 | 10/2016 | Akeley | |
| 2016/0307372 A1 | 10/2016 | Pitts et al. | |
| 2016/0309065 A1 | 10/2016 | Karafin et al. | |
| 2016/0353006 A1* | 12/2016 | Andersen | H04N 17/002 |
| 2016/0353026 A1 | 12/2016 | Blonde et al. | |
| 2016/0381348 A1 | 12/2016 | Hayasaka | |
| 2017/0031146 A1* | 2/2017 | Zheng | G02B 21/0084 |
| 2017/0059305 A1 | 3/2017 | Nonn et al. | |
| 2017/0067832 A1 | 3/2017 | Ferrara, Jr. et al. | |
| 2017/0078578 A1* | 3/2017 | Sato | H04N 5/23293 |
| 2017/0094906 A1 | 3/2017 | Liang et al. | |
| 2017/0134639 A1 | 5/2017 | Pitts et al. | |
| 2017/0139131 A1 | 5/2017 | Karafin et al. | |
| 2017/0237971 A1 | 8/2017 | Pitts et al. | |
| 2017/0243373 A1 | 8/2017 | Bevensee et al. | |
| 2017/0244948 A1 | 8/2017 | Pang et al. | |
| 2017/0256036 A1 | 9/2017 | Song et al. | |
| 2017/0263012 A1 | 9/2017 | Sabater et al. | |
| 2017/0302903 A1 | 10/2017 | Ng et al. | |
| 2017/0358092 A1 | 12/2017 | Bleibel et al. | |
| 2017/0365068 A1 | 12/2017 | Tan et al. | |
| 2018/0007253 A1* | 1/2018 | Abe | H04N 5/2254 |
| 2018/0012397 A1 | 1/2018 | Carothers | |
| 2018/0020204 A1 | 1/2018 | Pang et al. | |
| 2018/0033209 A1 | 2/2018 | Akeley et al. | |
| 2018/0034134 A1 | 2/2018 | Pang et al. | |
| 2018/0070066 A1 | 3/2018 | Knight et al. | |
| 2018/0070067 A1 | 3/2018 | Knight et al. | |
| 2018/0082405 A1 | 3/2018 | Liang | |
| 2018/0089903 A1 | 3/2018 | Pang et al. | |
| 2018/0097867 A1 | 4/2018 | Pang et al. | |
| 2018/0158198 A1 | 6/2018 | Kamad | |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 06039486 | 4/2006 |
| WO | 06129677 | 12/2006 |
| WO | 07092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Levoy, M., "Autofocus: Contrast Detection", http://graphics.stanford.edu/courses/cs178/applets/autofocusPD.html, pp. 1-3, 2010.

Levoy, Marc, "Autofocus: Phase Detection", http://graphics.stanford.edu/courses/cs178/applets/autofocusPD.html, pp. 1-3, 2010.

Nayar, Shree, et al., "Shape from Focus", IEEE Transactions on Pattern Analysis and Machine Intelligence, vol. 16, No. 8, pp. 824-831, Aug. 1994.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Raskar, Ramesh et al., "Non-photorealistic Camera: Depth Edge Detection and Stylized Rendering using Multi-Flash Imaging", SIGGRAPH 2004.

Stensvold, M., "Hybrid AF: A New Approach to Autofocus Is Emerging for both Still and Video", Digital Photo Magazine, Nov. 13, 2012.

Tao, Michael, et al., "Depth from Combining Defocus and Correspondence Using Light-Field Cameras", Dec. 2013.

Autofocus systems and methods (http://en.wikipedia.org/wiki/Autofocus). Retrieved Jan. 2011.

U.S. Appl. No. 15/967,076, filed Apr. 30, 2018 listing Jiantao Kuang et al. as inventors, entitled "Automatic Lens Flare Detection and Correction for Light-Field Images".

U.S. Appl. No. 15/666,298, filed Aug. 1, 2017 listing Yonggang Ha et al. as inventors, entitled "Focal Reducer With Controlled Optical Properties for Interchangeable Lens Light-Field Camera".

U.S. Appl. No. 15/590,808, filed May 9, 2017 listing Alex Song et al. as inventors, entitled "Adaptive Control for Immersive Experience Delivery".

U.S. Appl. No. 15/864,938, filed Jan. 8, 2018 listing Jon Karafin et al. as inventors, entitled "Motion Blur for Light-Field Images".

U.S. Appl. No. 15/703,553, filed Sep. 13, 2017 listing Jon Karafin et al. as inventors, entitled "4D Camera Tracking and Optical Stabilization".

U.S. Appl. No. 15/590,841, filed May 9, 2017 listing Kurt Akeley et al. as inventors, entitled "Vantage Generation and Interactive Playback".

U.S. Appl. No. 15/590,951, filed May 9, 2017 listing Alex Song et al. as inventors, entitled "Wedge-Based Light-Field Video Capture".

U.S. Appl. No. 15/944,551, filed Apr. 3, 2018 listing Zejing Wang et al. as inventors, entitled "Generating Dolly Zoom Effect Using Light Field Image Data".

U.S. Appl. No. 15/874,723, filed Jan. 18, 2018 listing Mark Weir et al. as inventors, entitled "Multi-Camera Navigation Interface".

U.S. Appl. No. 15/897,994, filed Feb. 15, 2018 listing Trevor Carothers et al. as inventors, entitled "Generation of Virtual Reality With 6 Degrees of Freesom From Limited Viewer Data".

U.S. Appl. No. 15/605,037, filed May 25, 2017 listing Zejing Wang et al. as inventors, entitled "Multi-View Back-Projection to a Light-Field".

U.S. Appl. No. 15/897,836, filed Feb. 15, 2018 listing Francois Bleibel et al. as inventors, entitled "Multi-View Contour Tracking".

U.S. Appl. No. 15/897,942, filed Feb. 15, 2018 listing Francois Bleibel et al. as inventors, entitled "Multi-View Contour Tracking with Grabcut".

Adelsberger, R. et al., "Spatially Adaptive Photographic Flash," ETH Zurich, Department of Computer Science, Technical Report 612, 2008, pp. 1-12.

Adelson et al., "Single Lens Stereo with a Plenoptic Camera" IEEE Translation on Pattern Analysis and Machine Intelligence, Feb. 1992. vol. 14, No. 2, pp. 99-106.

Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.

Adobe Systems Inc, "XMP Specification", Sep. 2005.

Adobe, "Photoshop CS6 / in depth: Digital Negative (DNG)", http://www.adobe.com/products/photoshop/extend.displayTab2html. Retrieved Jan. 2013.

Agarwala, A., et al., "Interactive Digital Photomontage," ACM Transactions on Graphics, Proceedings of SIGGRAPH 2004, vol. 32, No. 3, 2004.

Andreas Observatory, Spectrograph Manual: IV. Flat-Field Correction, Jul. 2006.

(56) References Cited

OTHER PUBLICATIONS

Apple, "Apple iPad: Photo Features on the iPad", Retrieved Jan. 2013.
Bae, S., et al., "Defocus Magnification", Computer Graphics Forum, vol. 26, Issue 3 (Proc. Of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method", 1911, pp. 23-29.
Sony Corp, "Interchangeable Lens Digital Camera Handbook", 2011.
Sony, Sony's First Curved Sensor Photo: http://www.engadget.com; Jul. 2014.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Techcrunch, "Coolinis", Retrieved Jan. 2013.
Teo, P., et al., "Efficient linear rendering for interactive light design", Tech. Rep. STAN-CC-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane+parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.

(56) References Cited

OTHER PUBLICATIONS

Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.orgiwiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , 4, Mar. 1908, pp. 821-825.
Lumsdaine et al., "Full Resolution Lighffield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.

(56) References Cited

OTHER PUBLICATIONS

Malzbender, et al., "Polynomial Texture Maps", Proceedings SIGGRAPH 2001.
Marshall, Richard J. et al., "Improving Depth Estimation from a Plenoptic Camera by Patterned Illumination," Proc. Of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photograohy" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.

\* cited by examiner

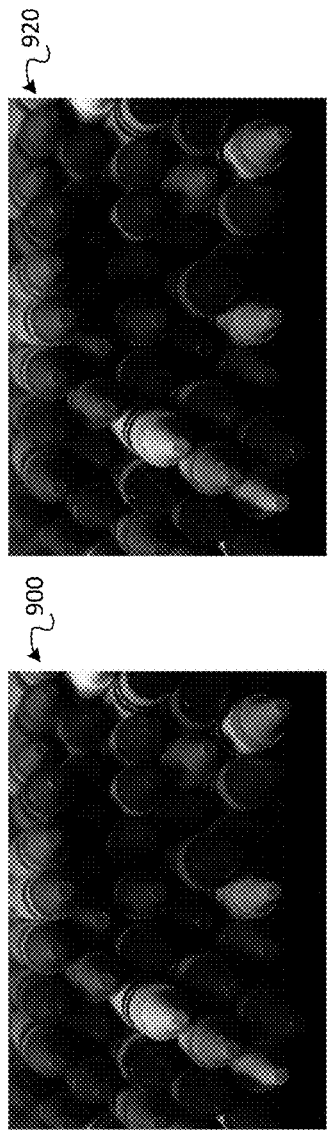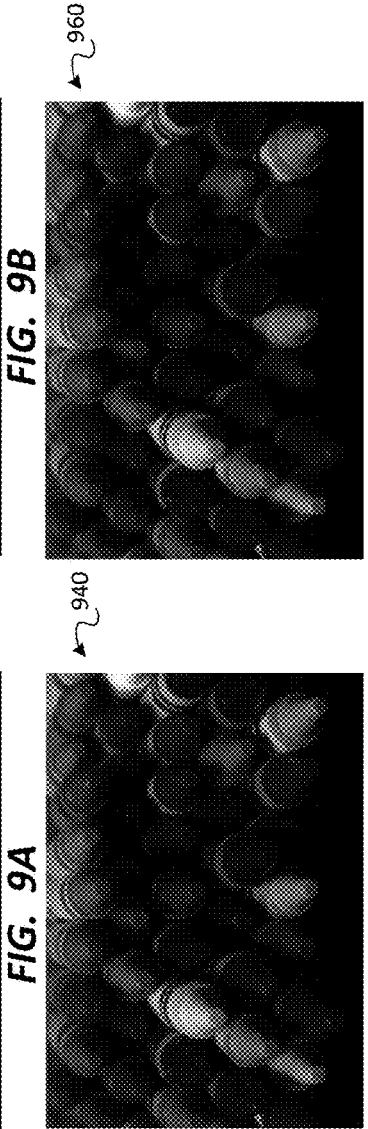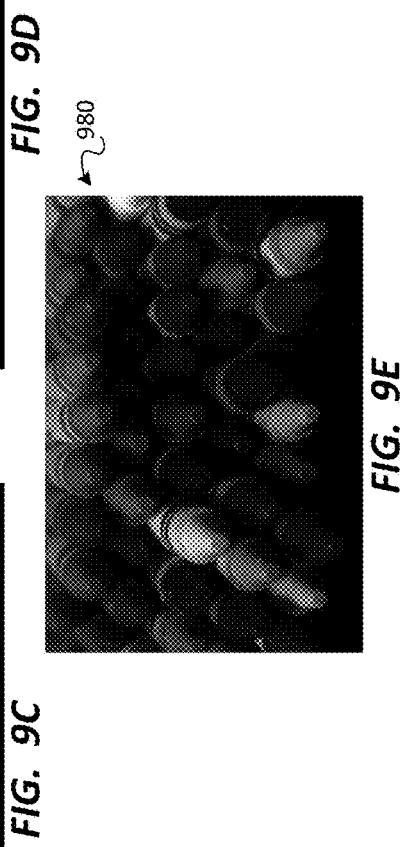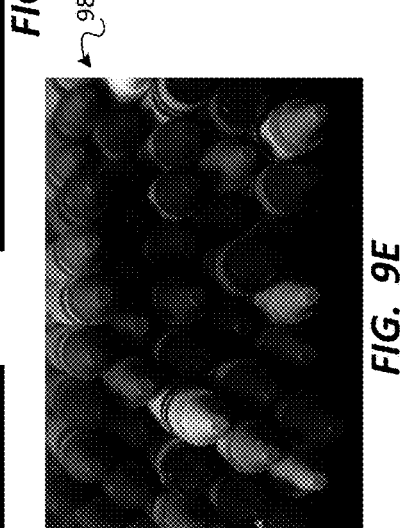

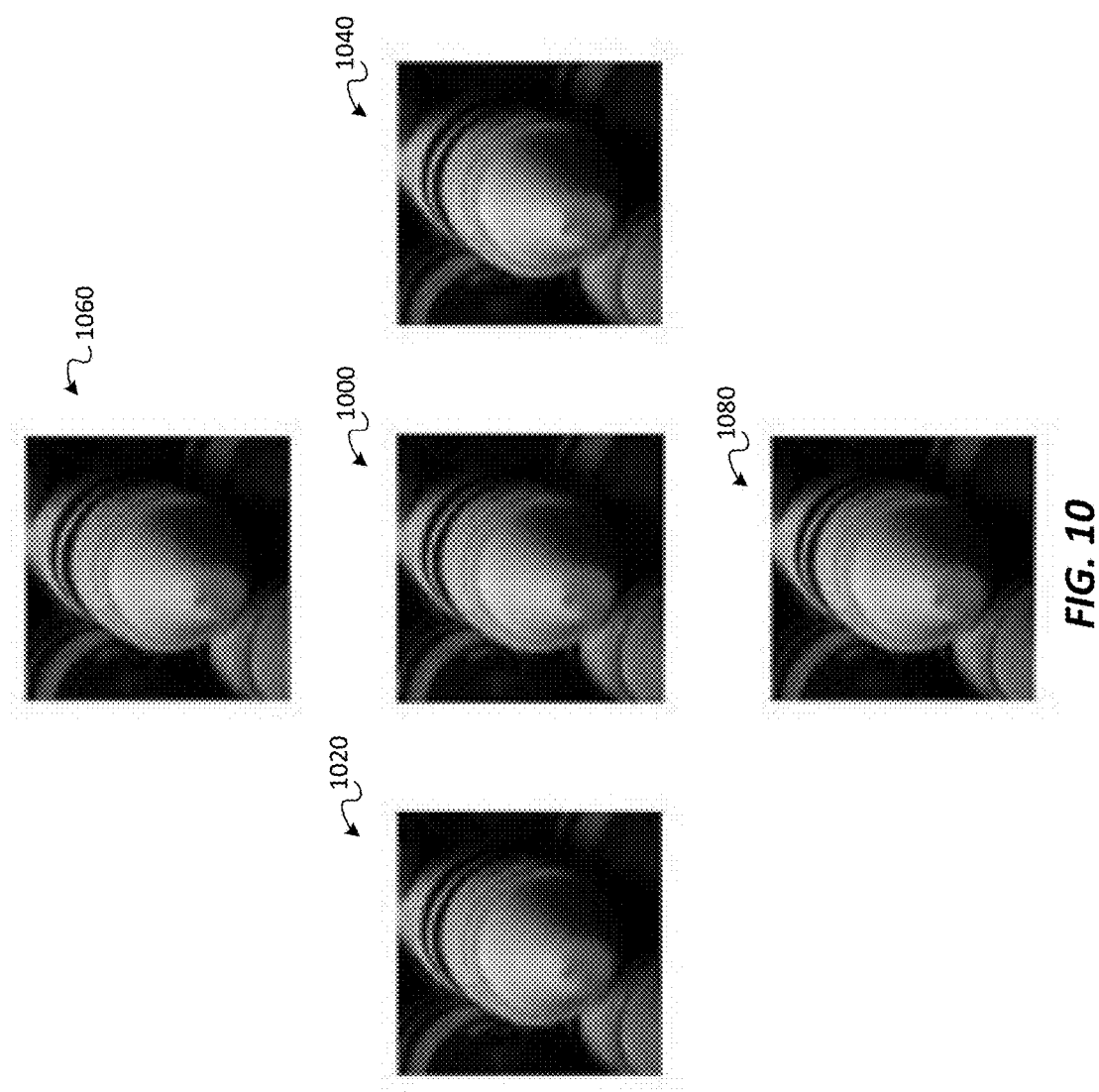

PHASE DETECTION AUTOFOCUS USING SUBAPERTURE IMAGES

CROSS-REFERENCE TO RELATED APPLICATION

The present application is a continuation-in-part of U.S. Utility application Ser. No. 13/867,333 for "Light-field Based Autofocus", filed on Apr. 22, 2013, which is incorporated herein by reference.

The present application is also a related to U.S. Utility application Ser. No. 14/302,826 for "Depth Determination for Light Field Images", filed on Jun. 12, 2014 and issued on Mar. 24, 2015 as U.S. Pat. No. 8,988,317, which is incorporated herein by reference.

The present application is also related to U.S. Utility application Ser. No. 13/774,986 for "Light field Processing and Analysis, Camera Control, and User Interfaces and Interaction on Light field Capture Devices", filed on Feb. 22, 2013 and issued on Mar. 31, 2015 as U.S. Pat. No. 8,995,785, which is incorporated herein by reference.

TECHNICAL FIELD

The present disclosure relates to systems and methods for capturing light-field data, and more specifically, to enhanced autofocus systems for light-field cameras.

BACKGROUND

Light-field imaging is the capture of four-dimensional light-field data that provides not only spatial information regarding light received from a scene, but also angular information indicative of the angle of incidence of light received from the scene by the camera's optical elements. Such four-dimensional information may be used to project a variety of two-dimensional images, including images at various focus depths, relative to the camera. Further, the light-field information may be used to ascertain the depth of objects in the scene. Yet further, the light-field information may be used to enable and/or facilitate various image processing steps by which the light-field and/or projected two-dimensional images may be modified to suit user requirements.

In conventional photography, a wide variety of autofocus systems are used. In phase detection autofocus implementations, the camera typically has a separate optical pathway, which may be accessed by diverting some of the incoming light away from the path leading to the image sensor used to capture the image. The diverted light may be conveyed to an autofocus module, which may include several pairs of miniature image sensors. Each pair may be positioned to measure the focus at a particular focus point in the scene. Such autofocus systems can add significantly to the cost, expense, and complexity of the camera, and can cause the loss of some of the light that could otherwise be used to facilitate proper image exposure in the main image sensor.

Contrast detection autofocus systems may determine the level of focus of image data by assessing the contrast of the image. Such systems may not require the use of a separate optical pathway for implementation of the autofocus system; however, such systems may require the lens to sweep through a broad range of focus positions, capturing images at each one, so that the contrast levels of the images can be compared. Thus, contrast detection autofocus systems may be relatively slow in operation.

Accordingly, known autofocus systems for conventional and light-field image capture are deficient in many respects. Phase detection and contrast detection autofocus systems both have significant drawbacks that have not been sufficiently addressed.

SUMMARY

In some embodiments, the architecture of the light-field camera may facilitate the implementation of autofocus techniques that do not require the use of a separate optical pathway or image sensors. Rather, the same optical pathway and image sensor used to capture the light-field image may be used to capture preliminary light-field data that can be analyzed to automatically focus the main lens of the camera.

In some embodiments, a plenoptic light-field camera may be used. The plenoptic light-field camera may have an aperture, a main lens, a microlens array, and an image sensor. According to one method, light may be received through the aperture via the main lens of the light-field camera at a first focus setting. The light may be directed to the image sensor via an optical pathway. The image sensor may capture the light to generate preliminary light-field data. The preliminary light-field data may be used to generate an offset, which may be used to refocus the main lens to a second focus setting. This procedure may be repeated until the light-field camera is properly focused.

In some embodiments, the offset may be generated via an algorithm that uses the preliminary light-field data to carry out phase detection. The algorithm may analyze a plurality of subaperture images generated from the preliminary light-field data. The subaperture images may be cropped at the same position, and then the cropped subaperture images may be compared. Specifically, one or more features appearing in each of the cropped subaperture images may be identified, and the positions of these features may be compared in the subaperture images. This may lead to the identification of the offset. The offset may be a vector indicating the direction and magnitude of refocusing needed to bring the image into proper focus. The offset may be used to refocus the main lens prior to image capture.

In some embodiments, contrast detection may be carried out in addition to or in place of phase detection. According to one combined approach, the method set forth above may be used to obtain the offset via analysis of the subaperture images. The offset may then be used as an endpoint or midpoint for a focus sweep of the main lens. In the course of the focus sweep, a plurality of intermediate focus settings may be used to capture intermediate light-field data. For each intermediate light-field data, a contrast level may be computed. The contrast levels may be compared to identify an optimal intermediate focus setting at which the contrast level is the highest. This intermediate focus setting may be used to refocus the main lens prior to image capture.

BRIEF DESCRIPTION OF THE DRAWINGS

The accompanying drawings depict several embodiments. Together with the description, they serve to explain the principles of the embodiments. One skilled in the art will recognize that the particular embodiments depicted in the drawings are merely exemplary, and are not intended to limit scope.

FIGS. 9A through 9E depict five subaperture images generated from the preliminary light-field data used to generate the light-field image of FIG. 8, according to one embodiment.

FIG. 10 depicts cropped subaperture images generated by cropping the subaperture images of FIGS. 9A through 9E, in relative positions that illustrate the performance of phase detection, according to one embodiment.

DEFINITIONS

Figure 1:
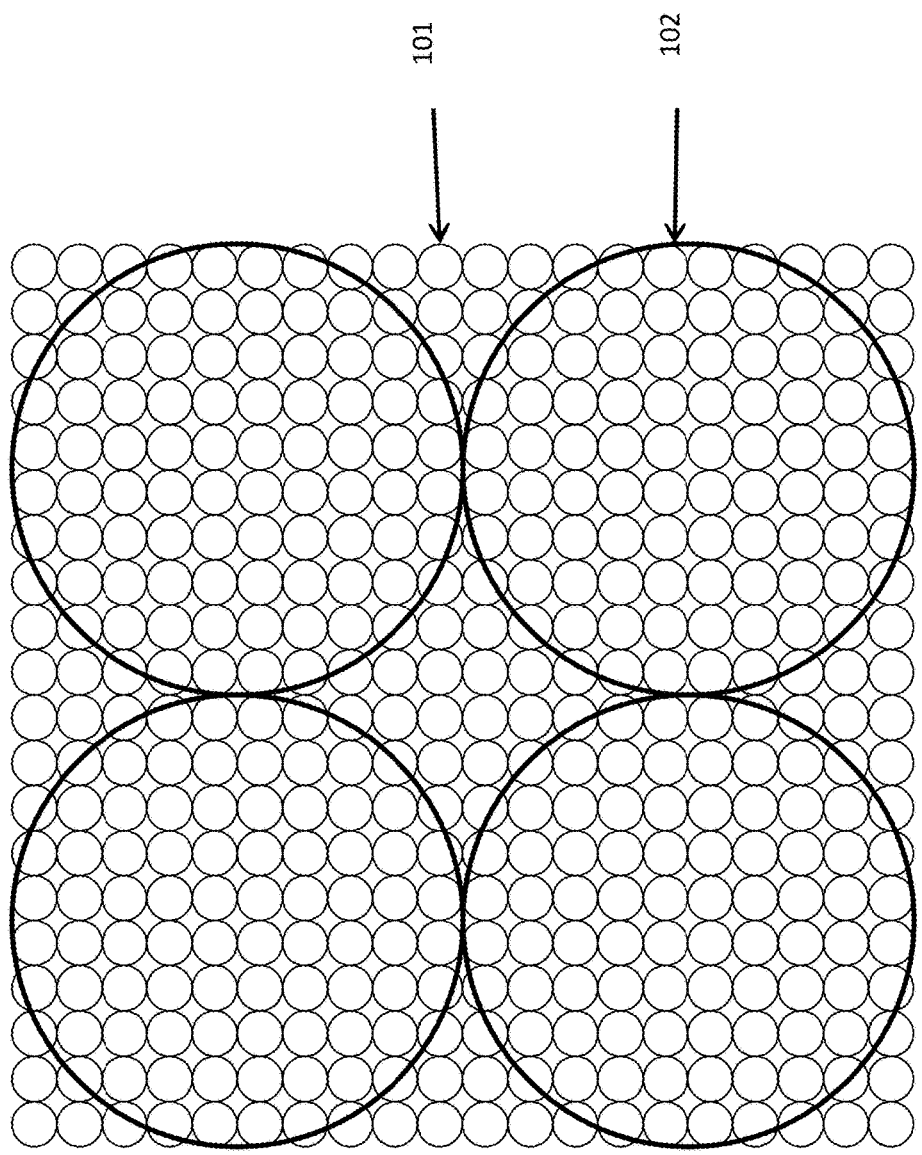
FIG. 1 depicts a portion of a light-field image.

For purposes of the description provided herein, the following definitions are used:

Aperture: an opening through which light enters a camera.
Contrast level: the degree of contrast present in an image.
Cropping: a process by which a subset of an image is isolated for further use.
Data store: a hardware element that provides volatile or nonvolatile digital data storage.
Disk: a region in a light-field image that is illuminated by light passing through a single microlens; may be circular or any other suitable shape.
Epipolar image: an image as defined in U.S. Utility application Ser. No. 14/302,826 for "Depth Determination for Light Field Images", filed on Jun. 12, 2014 and issued on Mar. 24, 2015 as U.S. Pat. No. 8,988,317, which is incorporated herein by reference.
Focus setting: a parameter of a main lens indicating a displacement from the main lens at which objects in a scene will be in focus.
Focus sweep: a process by which the focus setting of a main lens is gradually changed, with image data captured at multiple focus settings along the focus sweep.
Four-dimensional coordinate, or 4-D coordinate: The coordinates (x, y, u, v) used to index a light-field sample. (x, y) may be referred to as the spatial coordinate and (u, v) may be referred to as the angular coordinate. In a light-field camera, (x, y) is the coordinate of the intersection point of a light ray with the microlens array, and (u, v) is that with the aperture plane.
Image: a two-dimensional array of pixel values, or pixels, each specifying a color.
Image data: digital data captured at a sensor that contains at least a portion of an image
Image sensor, sensor, or photosensor: a sensor that produces electrical signals in proportion to light received.
Light-field, or light-field data: four-dimensional data, such as a sample representing information carried by ray bundles captured by a light-field camera or other capture device. Each ray may be indexed by a four-dimensional coordinate (for example, x, y, u, v). This document focuses on digital light-fields captured by a single light-field camera, with all samples arranged in a two-dimensional array as on their layout on a photosensor.
Light-field image: an image that contains a representation of light-field data captured at the sensor.
Main lens: a lens or set of lenses that directs light from a scene along an optical path leading to an image sensor
Microlens: a small lens, typically one in an array of similar microlenses.
Microlens array: a pattern of microlenses.
Offset: an indication of desired change in a parameter of an optical component, such as the focus setting of a main lens.
Optical pathway: a path to be followed by light within a camera; may be straight and direct, or may have one or more angles introduced by optical elements such as mirrors and lenses.
Plenoptic light-field camera: a camera that uses a microlens array to capture four-dimensional light-field data.
Subaperture image: for a plenoptic light-field camera, an image generated from light-field data from the same location on each microlens of a microlens array.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
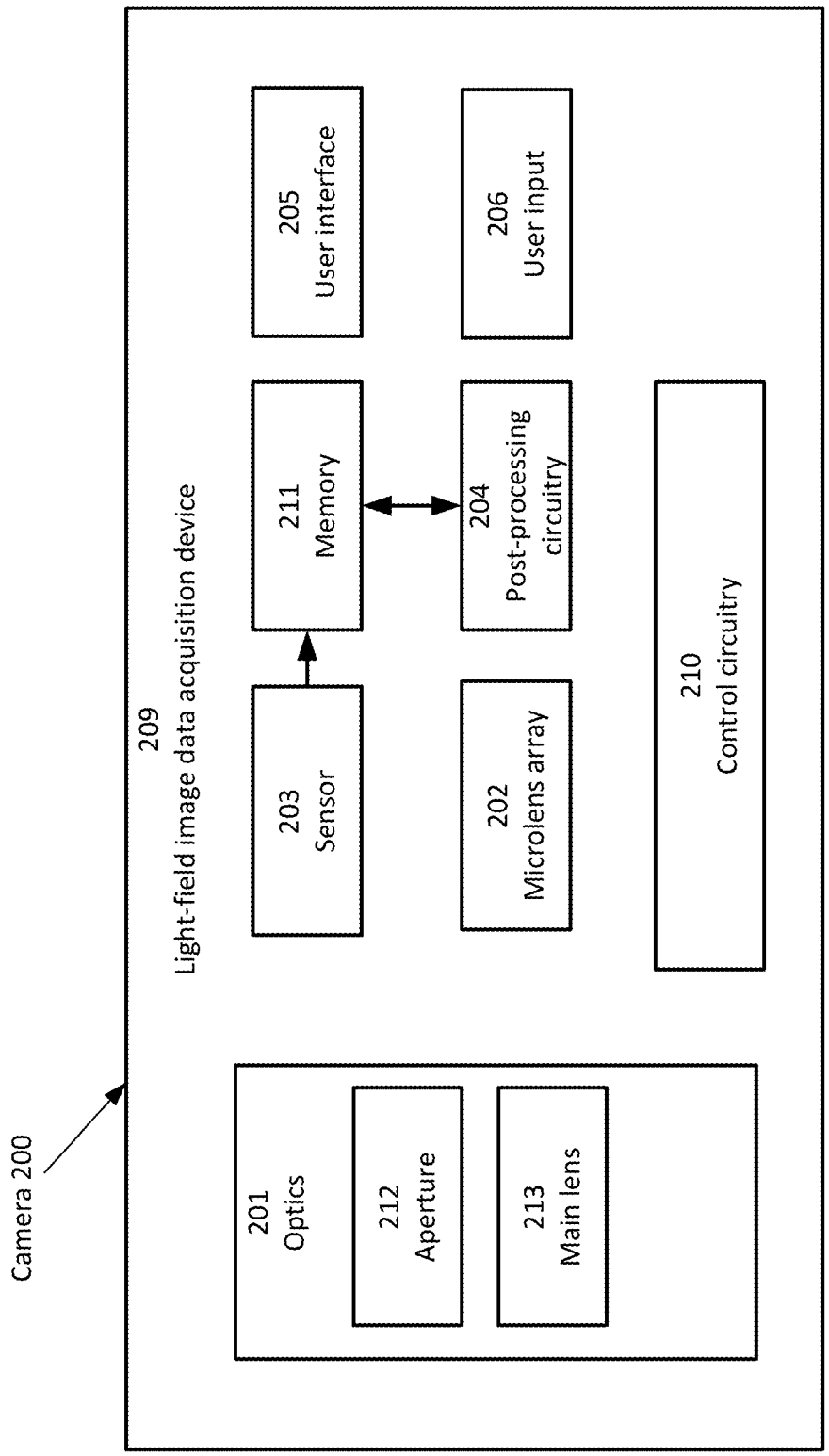
FIG. 2 depicts an example of an architecture for implementing the methods of the present disclosure in a light-field capture device, according to one embodiment.
Figure 3:
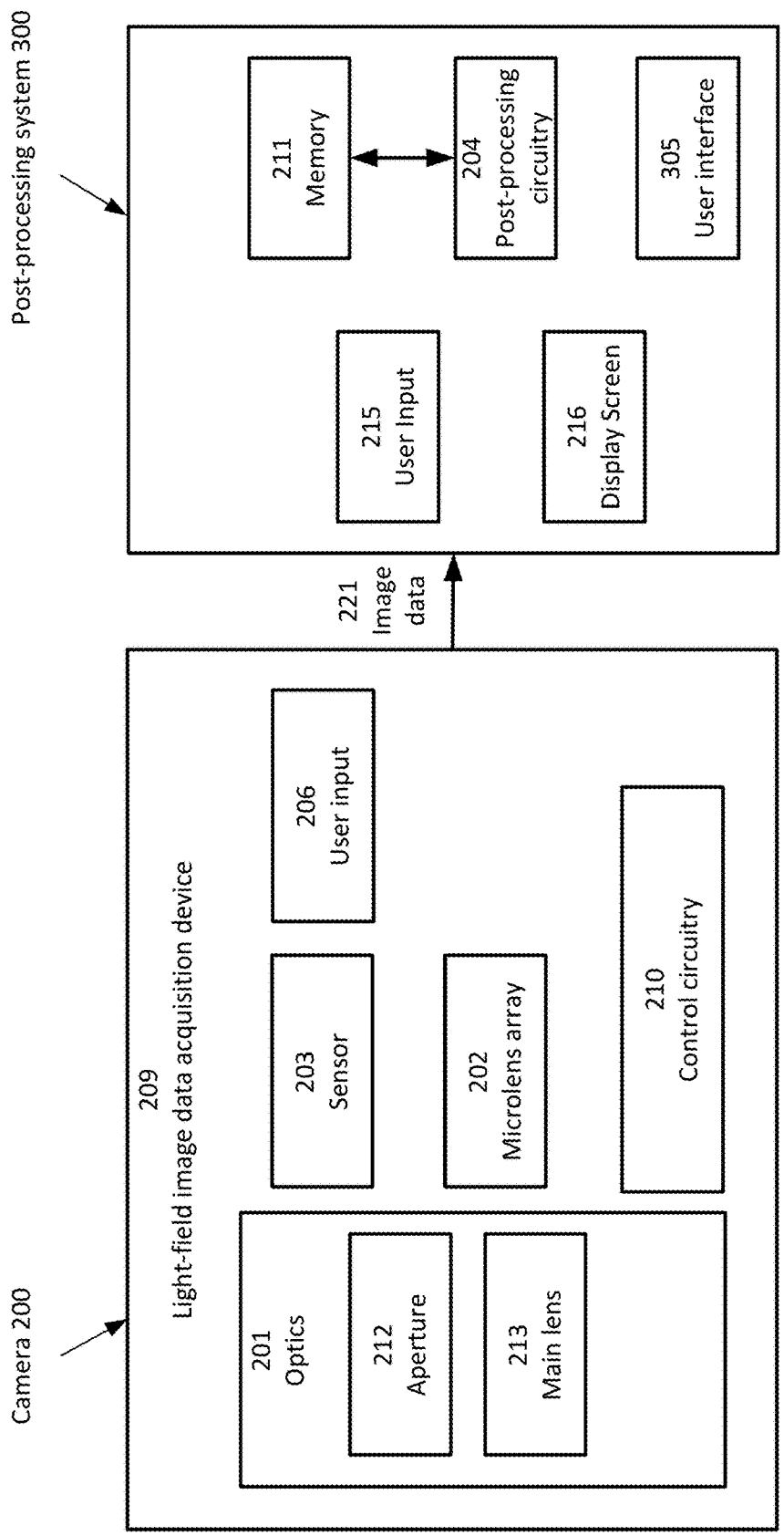
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200. One skilled in the art will further recognize that several of the components shown in the configurations of FIGS. 2 and 3 are optional, and may be omitted or reconfigured.

Figure 4:
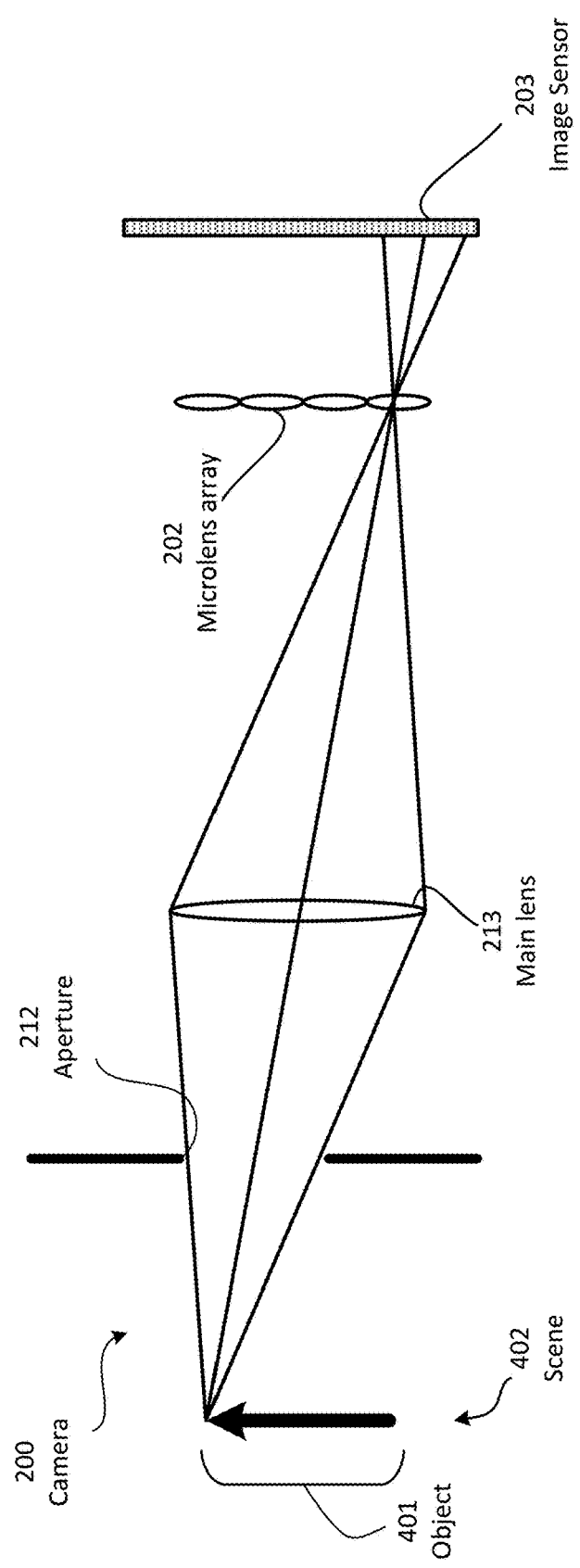
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and image sensor 203) so as to facilitate acquisition, capture, sampling of, recording, and/or obtaining light-field image data via image sensor 203. Referring now also to FIG. 4, there is shown an example of an architecture for a light-field camera, or camera 200, for implementing the method of the present disclosure according to one embodiment. The Figure is not shown to scale. FIG. 4 shows, in conceptual form, the relationship between aperture 212, main lens 213, microlens array 202, and image sensor 203, as such components interact to capture light-field data for one or more objects, represented by an object 401, which may be part of a scene 402.

In at least one embodiment, camera 200 may also include a user interface 205 for allowing a user to provide input for controlling the operation of camera 200 for capturing, acquiring, storing, and/or processing image data. The user interface 205 may receive user input from the user via an input device 206, which may include any one or more user input mechanisms known in the art. For example, the input device 206 may include one or more buttons, switches, touch screens, gesture interpretation devices, pointing devices, and/or the like.

Similarly, in at least one embodiment, post-processing system 300 may include a user interface 305 that allows the user to initiate processing, viewing, and/or other output of light-field images. The user interface 305 may additionally or alternatively facilitate the receipt of user input from the user to establish one or more parameters of subsequent image processing.

In at least one embodiment, camera 200 may also include control circuitry 210 for facilitating acquisition, sampling, recording, and/or obtaining light-field image data. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200.

For example, camera 200 may store raw light-field image data, as output by image sensor 203, and/or a representation thereof, such as a compressed image data file. In addition, as described in related U.S. Utility application Ser. No. 12/703, 367 for "Light-field Camera Image, File and Configuration Data, and Method of Using, Storing and Communicating Same," filed Feb. 10, 2010 and incorporated herein by reference in its entirety, memory 211 can also store data representing the characteristics, parameters, and/or configurations (collectively "configuration data") of device 209. The configuration data may include light-field image capture parameters such as zoom and focus settings.

In at least one embodiment, captured image data is provided to post-processing circuitry 204. The post-processing circuitry 204 may be disposed in or integrated into light-field image data acquisition device 209, as shown in FIG. 2, or it may be in a separate component external to light-field image data acquisition device 209, as shown in FIG. 3. Such separate component may be local or remote with respect to light-field image data acquisition device 209. Any suitable wired or wireless protocol can be used for transmitting image data 221 to circuitry 204; for example, the camera 200 can transmit image data 221 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 215 and/or a display screen 216. If desired, light-field image data may be displayed for the user on the display screen 216.

Light-Field Imaging Overview

Light-field images often include a plurality of projections (which may be circular or of other shapes) of aperture 212 of camera 200, each projection taken from a different vantage point on the camera's focal plane. The light-field image may be captured on image sensor 203. The interposition of microlens array 202 between main lens 213 and image sensor 203 causes images of aperture 212 to be formed on image sensor 203, each microlens in microlens array 202 projecting a small image of main-lens aperture 212 onto image sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x, y, u, v) resolution of (400, 300, 10, 10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light Field Image Processing," filed Feb. 22, 2013 and issued on Sep. 9, 2014 as U.S. Pat. No. 8,831,377, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light Field Image Processing" filed Feb. 22, 2013 and issued on Feb. 3, 2015 as U.S. Pat. No. 8,948,545, the disclosure of which is incorporated herein by reference in its entirety.

Autofocus in Light-Field Cameras

In order to overcome the problems referenced above with conventional autofocus systems and methods, the light-field camera architecture described above may be used to implement a variety of autofocus techniques. In some embodiments, such techniques may be implemented without the need for any additional sensors and/or optical pathways.

In some implementations, a phase detection method may be employed. This may be done at only one focus point within the imaging area of the camera 200, or alternatively, at each of multiple focus points. One exemplary method involving phase detection will be shown and described in connection with FIG. 5.

Phase Detection Autofocus

Figure 5:
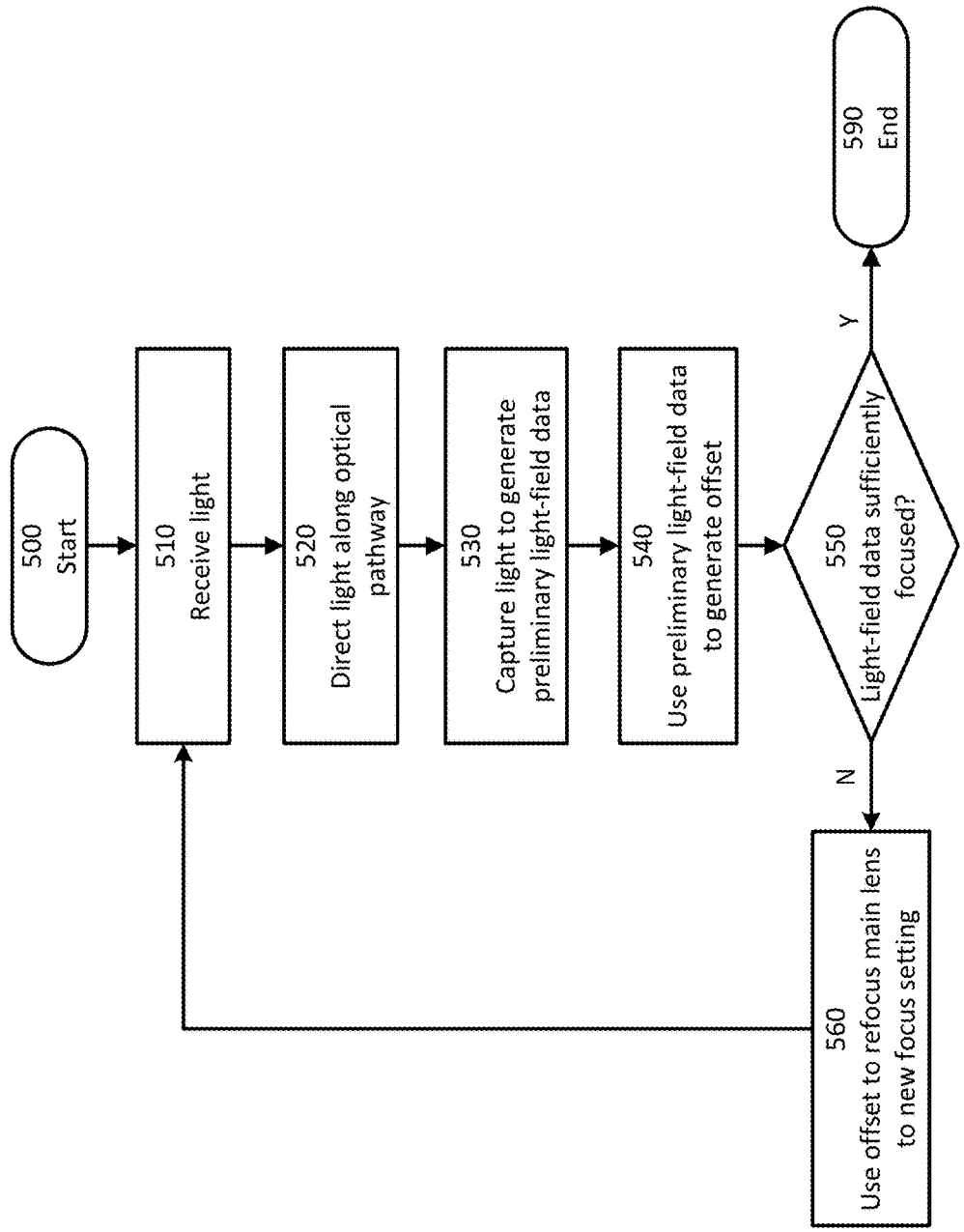
FIG. 5 depicts a method of focusing a light-field camera via phase detection of light-field data, according to one embodiment.

Referring to FIG. 5, a method is depicted, by which a light-field camera may be focused via phase detection of light-field data, according to one embodiment. The light-field camera with which the method of FIG. 5 is used may be a plenoptic light-field camera such as the light-field camera 200 of FIG. 2, or in alternative embodiments, may be configured differently. The method of FIG. 5 will be described in connection with the light-field camera 200 of FIG. 2, by way of example. Similarly, the light-field camera 200 of FIG. 2 may be used in conjunction with focusing methods other than that of FIG. 5.

The method may start 500 with a step 510 in which light is received in the camera 200. This may be done, for example, by opening the aperture 212 to permit the light to enter the interior of the camera 200. In step 520, the light may be directed along an optical pathway within the camera 200. This may be done through the use of one or more optical elements, which may include, but are not limited to, the main lens 213, the microlens array 202, and one or more mirrors and/or prisms (not shown). The optical pathway may be straight, as illustrated in FIG. 4, or may have one or more angles or bends introduced through the use of optical elements such as mirrors and/or prisms.

In step 530, the light may be captured, for example, by the image sensor 203, to generate preliminary light-field data representative of the light captured. The camera 200 may not necessarily be in focus during performance of step 530. Thus, the preliminary light-field data may not be properly focused.

In step 540, the preliminary light-field data may be used to generate an offset by which the focus of the camera 200 is to be adjusted to bring newly-captured light-field data, of the same scene as that imaged by the preliminary light-field data, into or toward proper focus. The offset may be a vector indicating the magnitude and direction that the focus setting of the camera 200 should be changed in order to focus the camera 200. In some embodiments, the offset may be a positive or negative number that indicates a change in the distance from the camera 200 at which the main lens 213 is focused. Alternatively, the offset may be a positive or negative number that indicates a change in position of one or more components of the main lens 213, which may be automatically movable via a motor or other mechanism (not shown) in response to determination of the offset.

The method of FIG. 5 may be iterative, as shown, so that the offset obtained in step 540 need not necessarily be selected to fully focus the camera 200. Thus, pursuant to a query 550, a determination may be made as to whether the camera 200 is sufficiently focused. In certain embodiments, this may be done by determining whether the offset is greater than a threshold value. If the offset is greater than the threshold value, this may indicate the camera 200 is not sufficiently focused without applying the offset. If the offset is less than the threshold value, this may indicate that the camera 200 is sufficiently focused.

In some embodiments, a confidence factor may be calculated as part of step 540 as the offset is determined. The confidence factor may indicate a degree of confidence in the accuracy of the offset. For example, if step 540 involves the comparison of multiple subaperture images, the offset may be determined by combining the focus offsets calculated between different pairs of the subaperture images. Such a combination may be made, for example, by averaging the focus offsets to obtain the offset. A standard deviation or other metric may be calculated to indicate the magnitude of variability present in the focus offsets. Such a metric may be used to obtain the confidence factor.

In some examples, a high confidence factor may indicate high confidence that application of the offset will bring the camera 200 into proper focus. Conversely, a low confidence factor may indicate relatively low confidence that application of the offset will properly focus the camera 200. If desired, the magnitude of the confidence factor may be taken into account in query 550, for example, in addition to or in the alternative to the magnitude of the offset. In some embodiments, query 550 may employ a formula based on the magnitude offset and that of the confidence factor. For example, a focus score or other metric may be calculated based on the offset and the confidence factor, with a small offset and a high confidence factor leading to a higher focus score. Query 550 may determine that the camera 200 is in proper focus when the focus score exceeds a threshold value.

If query 550 is answered in the negative, the method may proceed to a step 560 in which the offset is used to refocus the main lens 213 of the camera 200. As indicated previously, the offset may specify the desired motion of one or more components of the main lens 213, or may indicate a focus depth that is to be obtained for the camera 200, or the like. A motor (not shown) or other actuation device may move the main lens 213 in the manner specified by the offset.

After the offset has been applied, the camera 200 may be focused at a new setting, which may be used in the reiteration of step 510, step 520, step 530, step 540, and query 550. Reiteration of step 540 may result in generation of a new offset based on the new preliminary light-field data generated in step 530.

Once query 550 is answered in the affirmative, the camera 200 is deemed to be in focus, and the method may end 590. The camera 200 may then capture additional light to generate new light-field data at the current focus setting. This light-field data may be used to generate the desired light-field image. In the alternative, after termination of the method, the most recent preliminary light-field data captured by the camera 200, and used to calculate the most recent offset, may be recorded and used to generate the desired light-field image.

Step 540 of generating the offset may be performed in a wide variety of ways. In some embodiments, a phase detection algorithm may be used. One example of how step 540 may be carried out will be shown and described in connection with FIG. 6.

Figure 6:
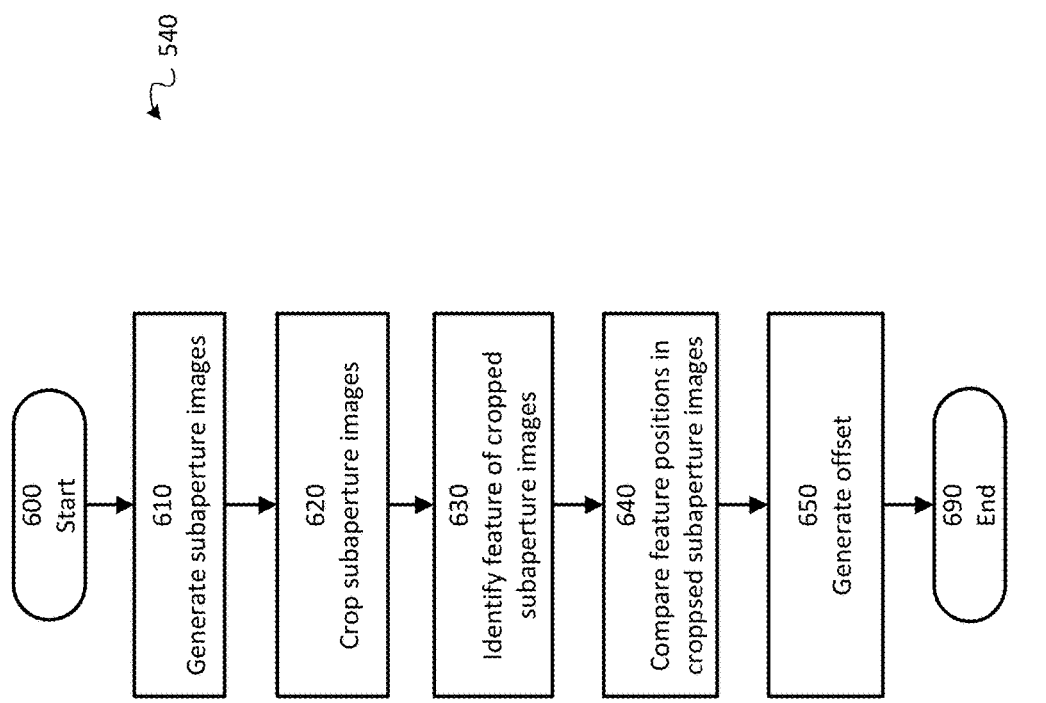
FIG. 6 depicts a method of carrying out the step of using the preliminary light-field data to generate an offset of FIG. 5 in greater detail, according to one embodiment.

Referring now to FIG. 6, step 540 of using the preliminary light-field data to generate an offset of FIG. 5 is depicted in greater detail, according to one embodiment. Step 540 may be carried out in many different ways; FIG. 6 merely presents one example within the scope of the present disclosure.

Step 540 may start 600 with a step 610 in which a plurality of subaperture images are generated based on the preliminary light-field data generated in step 530. Each subaperture image may be generated by taking pixels from the same location on each microlens of the microlens array 202 of the camera 200, and combining them into a two-dimensional image. The subaperture images may advantageously be generated based on pixel locations that are near the center of each microlens of the microlens array 202, and are relatively close to each other. In some embodiments, the subaperture images may be generated based on a pattern, for example, with a central subaperture image surrounded by a plurality of peripheral subaperture images, as will be shown and further described in the example.

In step 620, the subaperture images generated in step 610 may be cropped to facilitate further analysis. The subaperture images may be cropped in such a manner that the same portion (for example, a rectangular portion bounded by the same two-dimensional Cartesian coordinates) of each of the subaperture images is kept. Thus, a plurality of cropped subaperture images may be obtained.

In step 630, one or more features common to each of the cropped subaperture images may be identified. These features may be selected to be readily identifiable via an identification algorithm. Thus, the features may consist of high intensity points, low intensity points, high contrast areas (for example, the lines produced by the edges of objects), and/or the like. The same feature(s) may be identified within each of the cropped subaperture images.

In step 640, the relative positions of the feature(s) identified in step 630 may be ascertained and compared. These positions may, for example, be the Cartesian coordinates at which the feature is located in each cropped subaperture image. The differences between these positions, for adjacent pairs of cropped subaperture images, may be calculated to yield a series of focus offsets between pairs of images.

As indicated previously, the subaperture images may include a central subaperture image surrounded by peripheral subaperture images. Thus, the cropped subaperture images may be arranged with a central cropped subaperture image surrounded by peripheral cropped subaperture images. The focus offset of each cropped peripheral subaperture image, relative to the central cropped subaperture image, may be determined via comparison of the feature positions, as described above. This may yield a focus offset of each peripheral cropped subaperture image, relative to the central cropped subaperture image.

In step 650, the offset may be generated. In some embodiments, the offset may be computed by combining the focus offsets obtained in step 640, as described previously. In some examples, the focus offsets may be averaged or combined through the use of a different algorithm to yield the offset. In some embodiments, a confidence factor may also be generated, as described above. Step 540 may then end 690.

In addition to or in the alternative to the method of FIG. 6, the offset may be generated through the use of epipolar images. Epipolar images are described in U.S. Utility application Ser. No. 14/302,826 for "Depth Determination for Light Field Images" filed on Jun. 12, 2014 and issued on Mar. 24, 2015 as U.S. Pat. No. 8,988,317, which is incorporated herein by reference.

An epipolar image may be an image of a single line across a body of light-field data, which may provide an (x,v) plot of the data. In an epipolar image, the presence of vertical lines may indicate proper focus. Thus, a preponderance of the vertical lines in an epipolar image may be used to assess the focus level of the camera 200 at the location at which the epipolar image was taken. If desired, multiple epipolar images may be generated across various portions of light-field data to provide multiple focus points.

Phase Detection and Contrast Detection Autofocus

In some embodiments, autofocus may be carried out using the architecture of a light-field camera, such as the light-field camera 200, using both phase detection and contrast detection. In some methods, phase detection may be used to help define the range of a focus sweep that is to be used in contrast detection. Contrast detection may then be used to obtain the offset to be applied to the main lens 213 of the camera 200.

Figure 7:
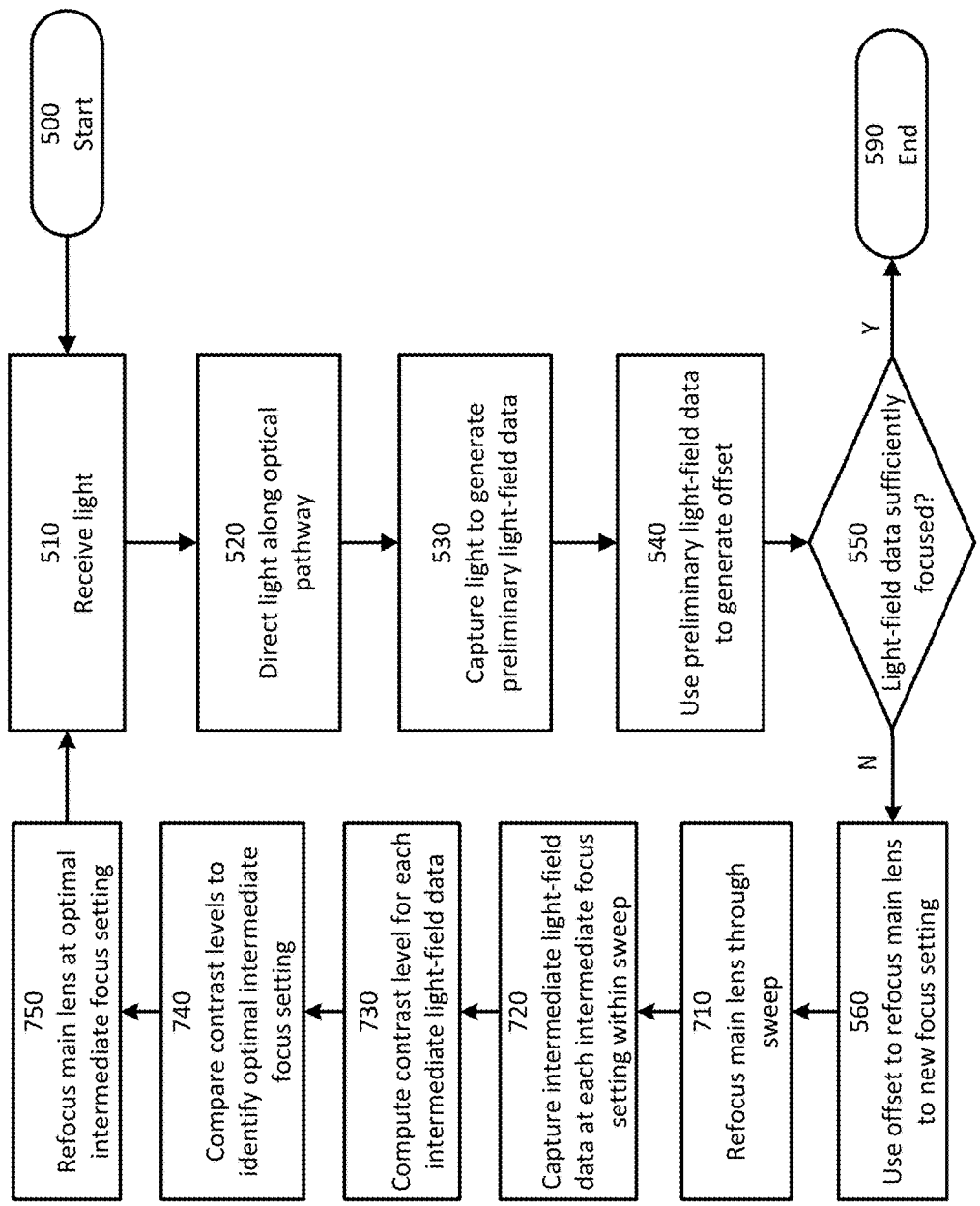
FIG. 7 depicts a method of focusing a light-field camera via phase detection and contrast detection, according to one embodiment.

Referring now to FIG. 7, a method is depicted by which a light-field camera may be focused via phase detection and contrast detection of light-field data, according to one embodiment. The light-field camera with which the method of FIG. 7 is used may be a plenoptic light-field camera such as the light-field camera 200 of FIG. 2, or in alternative embodiments, may be configured differently. The method of FIG. 7 will be described in connection with the light-field camera 200 of FIG. 2, by way of example. Similarly, the light-field camera 200 of FIG. 2 may be used in conjunction with focusing methods other than those of FIG. 5 and FIG. 7.

As shown, the method of FIG. 7 may include the same steps as that of FIG. 5, with additional steps added for contrast detection. Thus, the method may start 500 with step 510, step 520, step 530, step 540, and query 550, substantially as described in connection with FIGS. 5 and 6. Again, where query 550 is answered in the negative, step 560 may be carried out by using the offset to refocus the main lens 213 to the new focus setting. The new focus setting may optionally be that which is believed to bring the camera 200 into proper focus. Alternatively, the new focus setting may represent one end point of a focus sweep believed to contain the proper focus setting. Thus, for example, the new focus setting may be deliberately perturbed from the offset generated in step 540 so that the camera 200 can be moved through a focus sweep inclusive of the focus setting in which the offset is applied.

In step 710, the main lens 213 of the camera 200 may be focused through the sweep. This may entail gradually refocusing the main lens 213 through an incrementally-changing focus setting. As indicated previously, the focus setting of the main lens 213 may be automatically changed through the use of a motor or other actuator (not shown). Such an actuator may be used to refocus the main lens 213 through the desired range of focus settings, at the desired speed.

In step 720, intermediate light-field data may be captured at each of a plurality of intermediate focus settings within the focus sweep. In some examples, the focus sweep may be divided into a number of evenly-spaced increments, and the image sensor 203 of the camera 200 may capture intermediate light-field data at each of the increments.

In step 730, the contrast level may be computed for each package of intermediate light-field data captured in step 720. The contrast level may be computed via any of a variety of algorithms known in the art. A higher contrast level may indicate better focus.

In step 740, the contrast levels of the packages of intermediate light-field data computed in step 730 may be compared with each other until the intermediate light-field data with the highest contrast level has been identified. The focus setting used to capture the intermediate light-field data with the highest contrast setting may be identified as the optimal intermediate focus setting.

In some embodiments, this comparison may be carried out continuously as the intermediate light-field data is generated. For example, each time new intermediate light-field data is generated, its contrast level may be computed and compared with that of the intermediate light-field data generated immediately prior to it. If the contrast level of the new intermediate light-field data is higher, generation of intermediate light-field data may continue through the focus sweep until the contrast level of the new intermediate light-field data drops, by comparison with that of the intermediate light-field data generated immediately prior to it. When the contrast level begins to drop, it may be recognized that the focus sweep has moved through the optimal focus setting. The focus setting of the intermediate light-field data with the highest contrast level (for example, the intermediate light-field data captured immediately prior to reduction in the contrast level) may be identified as the optimal intermediate focus setting.

In step 750, the main lens 213 of the camera 200 may be refocused at the optimal intermediate focus setting identified in step 740. As shown, the method may then return to step 510, at which further phase detection may be carried out to determine, via query 550, whether the camera 200 is properly focused. If proper focus has not been achieved, the offset determined by phase detection may be applied in step 560, and contrast detection may be carried out again with a new focus sweep.

In alternative embodiments, after performance of step 750, further contrast detection may be carried out directly. Thus, for example, rather than returning to step 510, the method may return to step 710 for further contrast detection.

In some embodiments, a query similar to query 550 may be used to determine, based on results of the contrast detection, whether the camera 200 has been properly focused. This query may be carried out, for example, after the optimal intermediate focus setting has been identified in step 740. For example, if the contrast level of the intermediate light-field data generated at the optimal intermediate focus setting is below a threshold contrast level, it may be determined that the camera 200 is properly focused, and no further autofocus steps are needed. Thus, if the query is answered in the affirmative, the method may end 590.

Those of skill in the art will recognize that the methods of FIGS. 5, 6, and 7 are merely exemplary. The various steps presented may be re-ordered, or in some cases performed simultaneously, in various ways. Further, in alternative embodiments, some of these steps may be omitted, replaced, and/or supplemented with different steps. Any steps used in the performance of known autofocus algorithms may be used in conjunction with any of the methods of FIGS. 5, 6, and 7.

EXAMPLE

The performance of the methods of FIG. 5 and FIG. 6 will be illustrated in connection with FIGS. 8 through 11. FIGS. 8 through 11 are presented by way of example only, and not by way of limitation.

Figure 8:
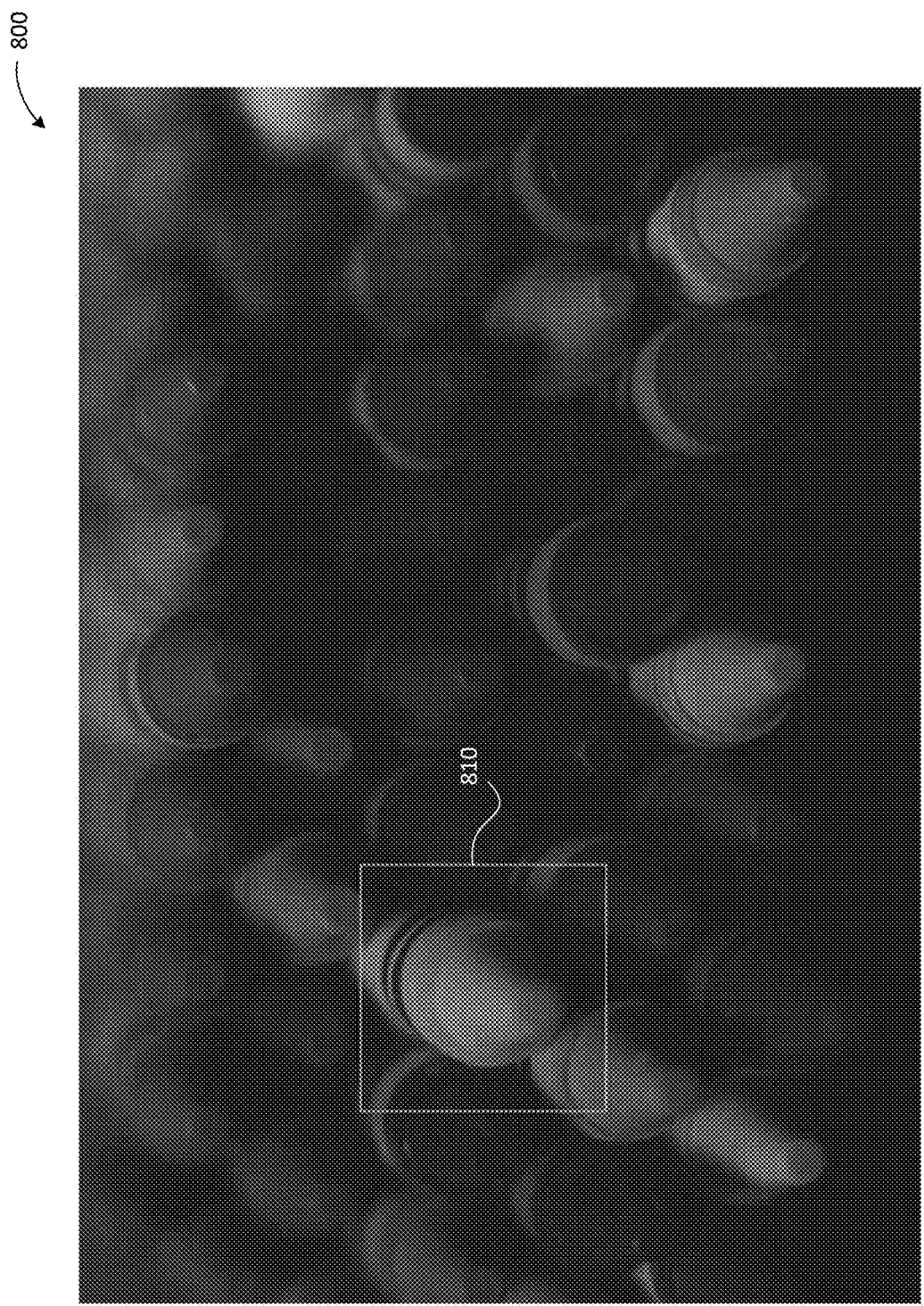
FIG. 8 depicts an exemplary preliminary light-field image generated from preliminary light-field data to be used for autofocus purposes, according to one embodiment.

Referring now to FIG. 8, an exemplary preliminary light-field image 800 is depicted. The preliminary light-field image 800 may be generated from preliminary light-field data to be used for autofocus purposes. Such preliminary light-field data may be generated in step 530 of FIG. 5. Autofocus may be carried out relative to one or more focus points within the preliminary light-field image 800, with the intention of bringing the focus point into proper focus. Where autofocus is conducted relative to multiple focus points, the user may have the option, in some embodiments, to select a focus point at which the camera 200 is to be focused. One focus point 810 is illustrated by way of example.

Referring now to FIGS. 9A through 9E, five subaperture images are depicted. The subaperture images may be generated from the preliminary light-field data used to generate the light-field image of FIG. 8, pursuant to step 610 of FIG. 6.

The subaperture images may include a first subaperture image 900, a second subaperture image 920, a third subaperture image 940, a fourth subaperture image 960, and a fifth subaperture image 980. Each of the subaperture images may be generated by combining the pixels at the same location on each microlens of the microlens array 202 of the camera 200. The subaperture images may be displaced from each other, for example, so that one of the subaperture images is a center subaperture image, and each of the other subaperture images is displaced slightly from the center subaperture image, either toward the right, toward the left, toward the top, or toward the bottom.

Referring now to FIG. 10, cropped subaperture images are depicted. The cropped subaperture images may be generated by cropping the subaperture images of FIGS. 9A through 9E pursuant to step 620 of FIG. 6. Cropping may be carried out such that the same portion (i.e., the same coordinates) of each of the subaperture images may be kept, as shown.

As also shown in FIG. 10, the cropped subaperture images may include a central cropped subaperture image 1000, a left cropped subaperture image 1020, a right cropped subaperture image 1040, a top cropped subaperture image 1060, and a bottom cropped subaperture image 1080. These subaperture images are arranged in FIG. 10 to indicate the relative positions, within each microlens of the microlens array 202, from which their pixels were taken. Performance of phase detection may be carried out with respect to these relative positions. The left cropped subaperture image 1020, the right cropped subaperture image 1040, the top cropped subaperture image 1060, and the bottom cropped subaperture image 1080 may constitute peripheral cropped subaperture images as described above.

With the main lens 213 of the camera 200 in proper focus, the cropped subaperture images of FIG. 10 may be expected to align with each other, so that when superimposed, their various features would line up on top of each other. However, when the camera 200 is out of focus, the features of the cropped subaperture images of FIG. 10 may be offset from each other. This offset may be calculated by identifying the same feature(s) in each of the cropped subaperture images, and then comparing their relative positions. For example, easily-identified features such as high contrast areas may be used. Specifically, the left and right sides of the crayon in each of the cropped subaperture images may each be high contrast areas that can be consistently identified and accurately located within each of the cropped subaperture images.

Figure 11:
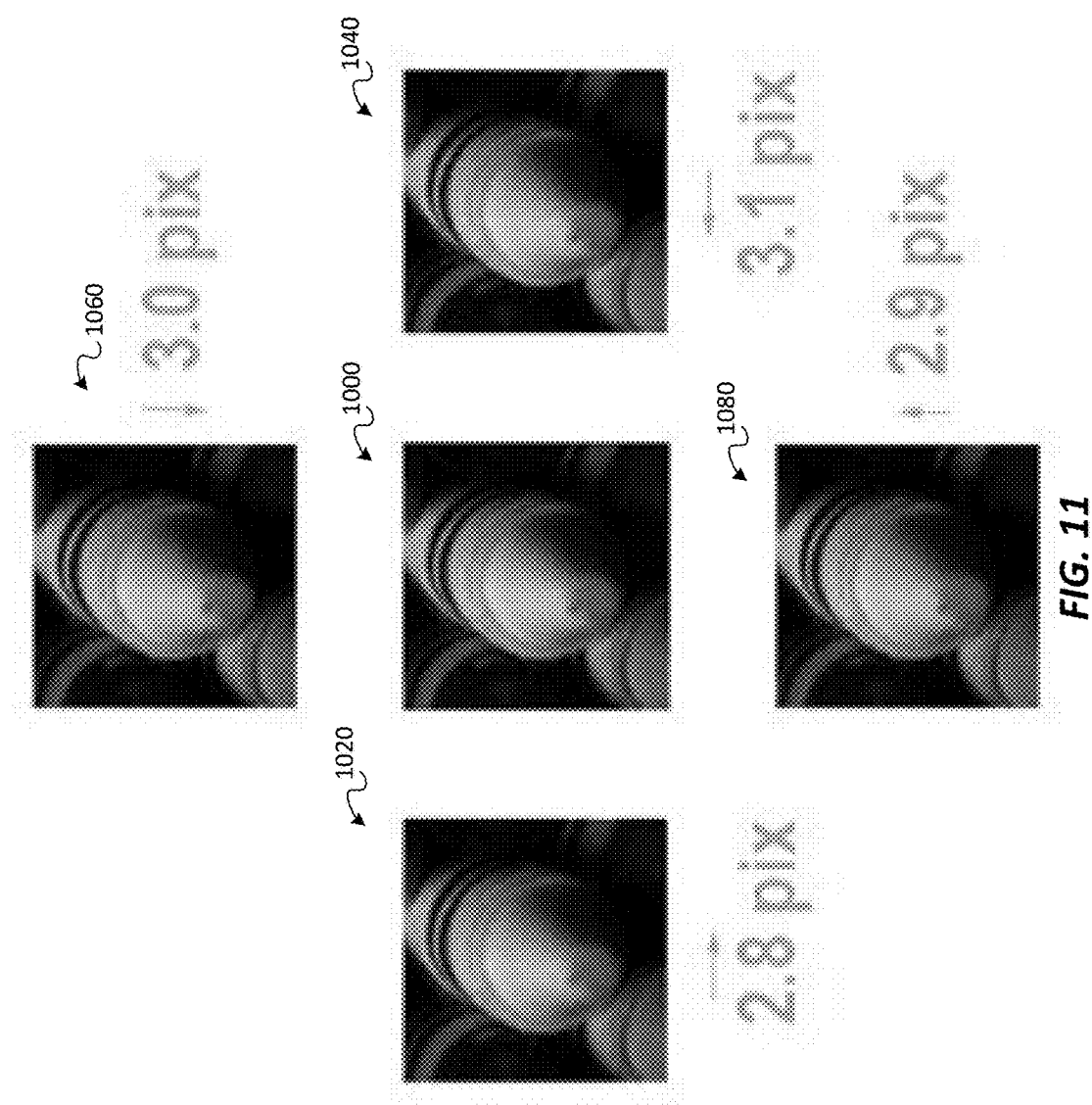
FIG. 11 depicts the cropped subaperture images of FIG. 10 with associated focus offsets determined via phase detection, according to one embodiment.

Referring now to FIG. 11, the cropped subaperture images of FIG. 10 are depicted, with associated focus offsets determined via phase detection. The focus offsets shown may be determined by identifying features of the cropped subaperture images and comparing the locations of these features within the cropped subaperture images, as described above.

The focus offsets shown may indicate that, in order to align with the central cropped subaperture image 1000, the left cropped subaperture image 1020 would need to move 2.8 pixels to the right, the right cropped subaperture image 1040 would need to move 3.1 pixels to the left, the top cropped subaperture image 1060 would need to move 3.0 pixels downward, and the bottom cropped subaperture image 1080 would need to move 2.9 pixels upward. These focus offsets all specify motion toward the central cropped subaperture image 1000, and thus may all entail focusing the main lens 213 of the camera 200 in the same direction, albeit with slightly varying magnitudes.

The focus offsets may be combined, for example, via averaging, to yield the offset to be applied to the main lens 213. The average value of the focus offsets is 2.95 pixels, and the direction of the offset may be determined by the directions of the focus offsets (i.e., either toward or away from the central cropped subaperture image 1000). Thus, it may be expected that applying the offset to refocus the main lens 213 may bring the camera into proper focus, at least relative to the focus point 810 shown in FIG. 8.

Notably, different focus settings may be needed to bring different portions of an image into focus. Thus, if a different focus point (not shown) in the preliminary light-field image 800 is selected, the methods of FIGS. 5 and 6 may need to be re-applied based on the newly-selected focus point. The result may be the application of a new offset that refocuses the main lens 213 of the camera 200 to a new focus setting suitable for bringing the newly-selected focus point into proper focus.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for focusing a light-field camera, the method comprising:
   through an aperture of the light-field camera, receiving first light with a main lens of the light-field camera at a first focus setting;
   directing the first light to a sensor of the light-field camera via an optical pathway;
   in the sensor, capturing the first light to generate preliminary light-field data;
   in a processor, using the preliminary light-field data to generate an offset;
   using the offset to refocus the main lens to a second focus setting; and
   wherein using the preliminary light-field data to generate the offset comprises:
   using the preliminary light-field data to generate a plurality of subaperture images;
   computing relative displacements between the subaperture images; and
   based on the relative displacements, generating the offset using an averaging of a set of focus offsets.

2. The method of claim 1, wherein computing relative displacements between the subaperture images comprises:
   cropping each of the subaperture images to provide a cropped subaperture image such that all cropped subaperture images depict the same image portion;
   identifying at least one feature of each of the cropped subaperture images; and
   comparing positions of the features within the cropped subaperture images to determine the relative displacements.

3. The method of claim 2, wherein calculating a plurality of relative positions of the features for adjacent pairs of the cropped subaperture images yields the set of focus offsets.

4. The method of claim 1, further comprising:
   refocusing the main lens through a sweep from the second focus setting to a third focus setting;
   at the sensor, at each of a plurality of intermediate focus settings between the second focus setting and the third focus setting, capturing intermediate light-field data;
   at the processor, for each intermediate light-field data, computing a contrast level; and
   comparing the contrast levels to identify an optimal intermediate focus setting of the intermediate focus settings at which contrast is the highest.

5. The method of claim 4, further comprising:
   refocusing the main lens to the optimal intermediate focus setting;
   through the aperture, receiving second light with the main lens at the optimal intermediate focus setting;
   directing the second light to the sensor via the optical pathway; and
   in the sensor, capturing the second light to generate a light-field image.

6. The method of claim 1, further comprising:
   at the processor, computing a confidence factor; and using the confidence factor to determine whether the light-field camera is properly focused.

7. The method of claim 1, further comprising:
through the aperture, receiving second light with the main lens at the second focus setting;
directing the second light to the sensor via the optical pathway; and
in the sensor, capturing the second light to generate a light-field image.

8. The method of claim 1, further comprising:
determining whether the light-field camera is properly focused with the main lens at the second focus setting; and
until the light-field camera is properly focused, iterating the steps of:
through the aperture, receiving additional light with the main lens;
directing the additional light to the sensor via the optical pathway;
in the sensor, capturing the additional light to generate additional preliminary light-field data;
in the processor, using the additional preliminary light-field data to generate an additional offset;
using the additional offset to refocus the main lens; and
determining whether the light-field camera is properly focused with the main lens.

9. A light-field camera comprising:
an aperture configured to receive first light with a main lens of the light-field camera at a first focus setting such that the first light is directed to a sensor of the light-field camera via an optical pathway;
a sensor configured to capture the first light to generate preliminary light-field data; and
a processor configured to:
use the preliminary light-field data to generate an offset;
use the offset to cause the main lens to be refocused to a second focus setting; and
wherein the processor is configured to use the preliminary light-field data to generate the offset by:
using the preliminary light-field data to generate a plurality of subaperture images;
computing relative displacements between the subaperture images; and
based on the relative displacements, generating the offset using an averaging of a set of focus offsets.

10. The light-field camera of claim 9, wherein computing relative displacements between the subaperture images comprises:
cropping each of the subaperture images to provide a cropped subaperture image such that all cropped subaperture images depict the same image portion;
identifying at least one feature of each of the cropped subaperture images; and
comparing positions of the features within the cropped subaperture images to determine the relative displacements.

11. The light-field camera of claim 9, wherein:
the processor is further configured to cause the main lens to be refocused through a sweep from the second focus setting to a third focus setting;
the sensor is further configured, at each of a plurality of intermediate focus settings between the second focus setting and the third focus setting, to capture intermediate light-field data;
the processor is further configured, for each intermediate light-field data, to compute a contrast level; and
the processor is further configured to compare the contrast levels to identify an optimal intermediate focus setting of the intermediate focus settings at which contrast is the highest.

12. The light-field camera of claim 11, wherein:
the processor is further configured to cause the main lens to be refocused to the optimal intermediate focus setting;
the aperture is further configured to receive second light with the main lens at the optimal intermediate focus setting such that the second light is directed to the sensor via the optical pathway; and
the sensor is further configured to capture the second light to generate a light-field image.

13. The light-field camera of claim 9, wherein the processor is further configured to:
computing a confidence factor; and
use the confidence factor to determine whether the light-field camera is properly focused.

14. The light-field camera of claim 9, wherein:
the aperture is further configured to receive second light with the main lens at the second focus setting such that the second light is directed to the sensor via the optical pathway; and
the sensor is further configured to capture the second light to generate a light-field image.

15. The light-field camera of claim 9, wherein the processor is further configured to:
determine whether the light-field camera is properly focused with the main lens at the second focus setting; and
until the light-field camera is properly focused, cause the light-field camera to iterate the steps of:
through the aperture, receiving additional light with the main lens such that the additional light is directed to the sensor via the optical pathway;
in the sensor, capturing the additional light to generate additional preliminary light-field data;
using the additional preliminary light-field data to generate an additional offset;
using the additional offset to refocus the main lens; and
determining whether the light-field camera is properly focused with the main lens.

16. The light-field image camera of claim 9, wherein computing relative displacements between the subaperture images comprises:
cropping each of the subaperture images to provide a cropped subaperture image such that all cropped subaperture images depict the same image portion;
identifying at least one feature of each of the cropped subaperture images;
comparing positions of the features within the cropped subaperture images to determine the relative displacements; and
calculating a plurality of relative position of the features for adjacent pairs of cropped subaperture images to yield the set of focus offsets.

* * * * *